US012567670B2

(12) United States Patent
Liu et al.

(10) Patent No.: US 12,567,670 B2
(45) Date of Patent: Mar. 3, 2026

(54) ANTENNA INCLUDING CONDUCTIVE PLATES AND CONDUCTIVE LOOPS AND CAPABLE OF REDUCING SPURIOUS EMISSIONS

(71) Applicant: MEDIATEK INC., Hsin-Chu (TW)

(72) Inventors: Chih-Hsiang Liu, Hsinchu (TW); Nai-Chen Liu, Hsinchu (TW); Wun-Jian Lin, Hsinchu (TW); Shih-Huang Yeh, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 131 days.

(21) Appl. No.: 18/739,273

(22) Filed: Jun. 10, 2024

(65) Prior Publication Data

US 2025/0266617 A1 Aug. 21, 2025

Related U.S. Application Data

(60) Provisional application No. 63/555,143, filed on Feb. 19, 2024.

(51) Int. Cl.
*H01Q 7/00* (2006.01)
*H01Q 1/38* (2006.01)

(52) U.S. Cl.
CPC ................ *H01Q 7/00* (2013.01); *H01Q 1/38* (2013.01)

(58) Field of Classification Search
CPC .................................. H01Q 7/00; H01Q 1/38
See application file for complete search history.

(56) References Cited

U.S. PATENT DOCUMENTS 7,446,729 B2 * 11/2008 Maruyama ............ H01Q 21/06 343/742
10,879,611 B2 * 12/2020 Sugimoto ........... H01Q 9/0407

FOREIGN PATENT DOCUMENTS

EP 4207492 A1 * 7/2023 .............. H01Q 5/40

* cited by examiner

*Primary Examiner* — Seung H Lee
(74) *Attorney, Agent, or Firm* — Winston Hsu

(57) ABSTRACT

An antenna includes a first conductive plate, a first conductive loop, a second conductive plate, a second conductive loop, a first conductive path, and a second conductive path. The first conductive loop can be disposed below the first conductive plate. The second conductive loop can be disposed below the second conductive plate. The first conductive path can include a first terminal electrically connected to the first conductive plate, and a second terminal electrically connected to a ground layer. The second conductive path can include a first terminal electrically connected to the second conductive plate, and a second terminal electrically connected to the ground layer. The first conductive plate and the second conductive plate can be used to access wireless signals, and the first conductive loop and the second conductive loop can be used to suppress a signal portion of a frequency band.

19 Claims, 11 Drawing Sheets

ANTENNA INCLUDING CONDUCTIVE PLATES AND CONDUCTIVE LOOPS AND CAPABLE OF REDUCING SPURIOUS EMISSIONS

CROSS REFERENCE TO RELATED APPLICATIONS

This application claims the benefit of U.S. Provisional Application No. 63/555,143, filed on Feb. 19, 2024. The content of the application is incorporated herein by reference.

BACKGROUND

In wireless communication, a spurious emission can refer to radiated radio frequency signal that, if completely suppressed, would not reduce the integrity of the modulation type or the information being transmitted. In other words, it's a radiated signal that goes beyond the channel allocated to the transmitter. For example, spurious emissions can be unwanted noise that can interfere with the signal accessed by an antenna.

In the domain of wireless communication, it's crucial to impose specific constraints on the spurious emissions of products to guarantee their performance and quality. To this end, several regions have instituted pertinent regulations. To mitigate signal leakage that falls into the spurious domain, filters can be implemented in both high-band and low-band paths to reduce unanticipated signal components. However, the introduction of supplementary filters can result in signal loss, thereby posing a challenge for the system to fulfill the requirements. Moreover, the incorporation of additional filters can escalate the system's size and inflate costs.

SUMMARY

An embodiment can provide an antenna including a first conductive plate, a first conductive loop, a second conductive plate, a second conductive loop, a first conductive path, and a second conductive path. The first conductive loop can be disposed below the first conductive plate. The second conductive loop can be disposed below the second conductive plate. The first conductive path can include a first terminal electrically connected to the first conductive plate, and a second terminal electrically connected to a ground layer. The second conductive path can include a first terminal electrically connected to the second conductive plate, and a second terminal electrically connected to the ground layer. The first conductive plate and the second conductive plate can be used to access wireless signals, and the first conductive loop and the second conductive loop can be used to suppress a first signal portion of a first frequency band.

These and other objectives of the present invention will no doubt become obvious to those of ordinary skill in the art after reading the following detailed description of the preferred embodiment that is illustrated in the various figures and drawings.

DETAILED DESCRIPTION

In the text, when the text refers to component A overlapping component B, it suggests that a projection of component A intersects with a projection of component B. It's not necessary for component A to physically touch component B; this is optional. As per various embodiments, the referenced conductive plates, conductive loops, and conductive sub-loops can be fabricated from metal or any other material with conductive characteristics.

Figure 1:
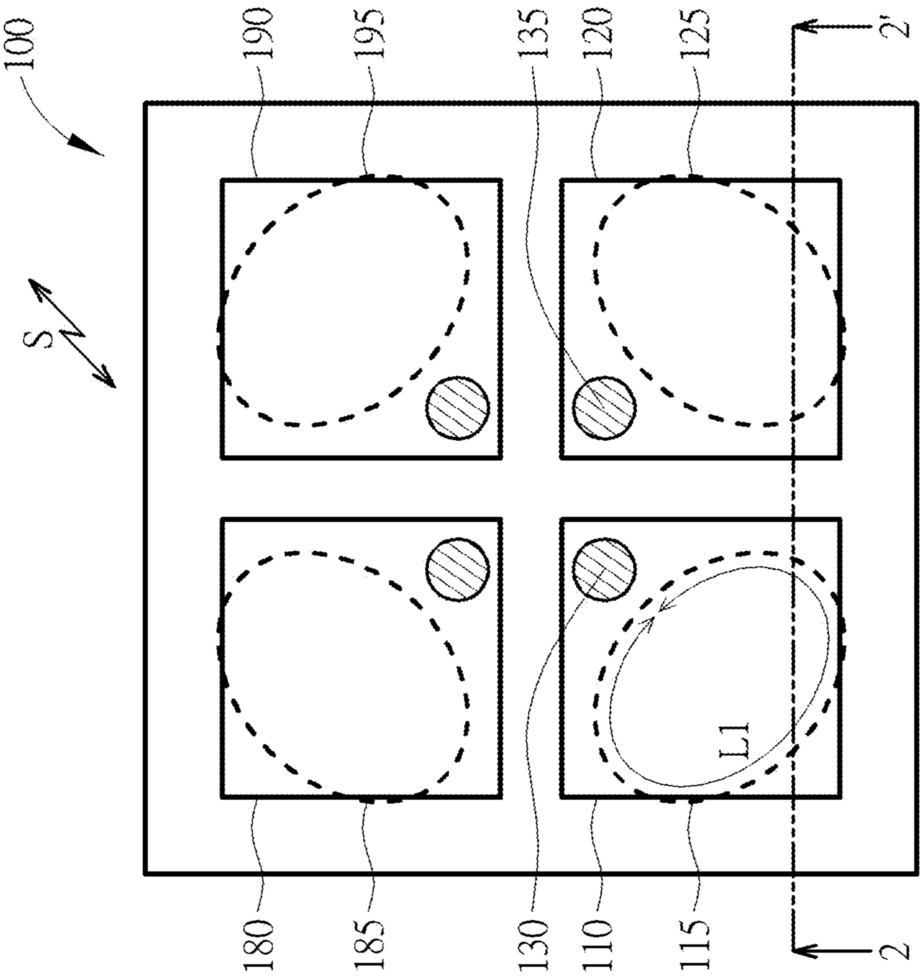
FIG. 1 illustrates a top view of an antenna according to an embodiment.
Figure 2:
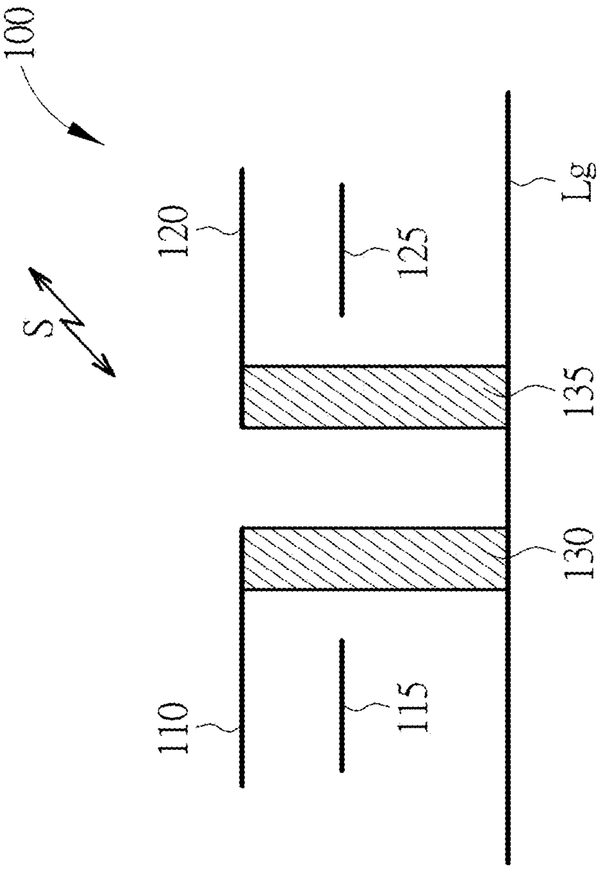
FIG. 2 illustrates a cross-sectional view of the antenna cutting along line 2-2' in FIG. 1.

FIG. 1 illustrates a top view of an antenna 100 according to an embodiment. FIG. 2 illustrates a cross-sectional view of the antenna 100 cutting along line 2-2' in FIG. 1.

In FIG. 1, it can be seen that antenna 100 can have four conductive plates 110, 120, 180, 190 and four corresponding conductive loops 115, 125, 185, 195. The four conductive loops 115, 125, 185, 195 can be disposed below the four conductive plates 110, 120, 180, 190 respectively.

However, FIG. 1 is merely an example. In the following, the structure of the antenna 100 will be explained using an example where the antenna 100 has at least two conductive plates and two conductive loops.

As shown in FIG. 1 and FIG. 2, the antenna 100 can include at least a conductive plate 110, a conductive loop 115, a conductive plate 120, a conductive loop 125, a conductive path 130 and a conductive path 135.

The conductive loop 115 can be disposed below the conductive plate 110. The conductive loop 125 can be disposed below the conductive plate 120. The conductive path 130 can include a first terminal electrically connected to the conductive plate 110, and a second terminal electrically connected to a ground layer Lg. The conductive path 135 can include a first terminal electrically connected to the conductive plate 120, and a second terminal electrically connected to the ground layer Lg.

The conductive plate 110 and the conductive plate 120 can be used to access wireless signals S, and the conductive loop 115 and the conductive loop 125 can be used to suppress a signal portion of a first frequency band.

The conductive loop 115 and the conductive loop 125 can be coplanar and formed using the same conductive layer of a circuit board (such as a printed circuit board). In another example, the conductive loop 115 and the conductive loop 125 can be non-coplanar and formed using different conductive layers of a circuit board (such as a printed circuit board).

In FIG. 1, the conductive loop 115 and the conductive loop 125 are depicted with an oval shape. However, FIG. 1 serves merely as an example, and embodiments are not limited thereto. If the conductive loops have other shapes, it is also within the scope of embodiments.

The conductive loop 115 and the conductive loop 125 can have the same shape. In another example, the shape of the conductive loop 115 can be different from the shape of the conductive loop 125.

The conductive plate 110 can have a projected plate area (denoted as A110). The conductive loop 115 can have an enclosed area (denoted as A115). The projected plate area A110 can overlap a portion of the enclosed area A115, where the portion of the enclosed area A115 can be larger than 90% of the enclosed area A115.

As shown in FIG. 1, the conductive loop 115 can be a closed conductive loop. The conductive loop 115 can have a perimeter (denoted as L1). A frequency in the first frequency band can be proportional to a reciprocal of the perimeter L1.

For example, the frequency of the signal portion suppressed by the conductive loop 115 and the conductive loop 125 can be represented as fn. The frequency fn can correspond to a single frequency or a set of frequencies, where n can be an index, and n can be an integer greater than zero. For example, n can be 1, 2, 3, etc. The frequency fn can be represented as fn=n×(vg/L1), where vg can be a phase velocity of electromagnetic (EM) waves in a dielectric material, and L1 can be the perimeter of the conductive loop 115. Therefore, the antenna 100 can suppress a signal portion corresponding to one frequency or a plurality of frequencies.

Figure 3:
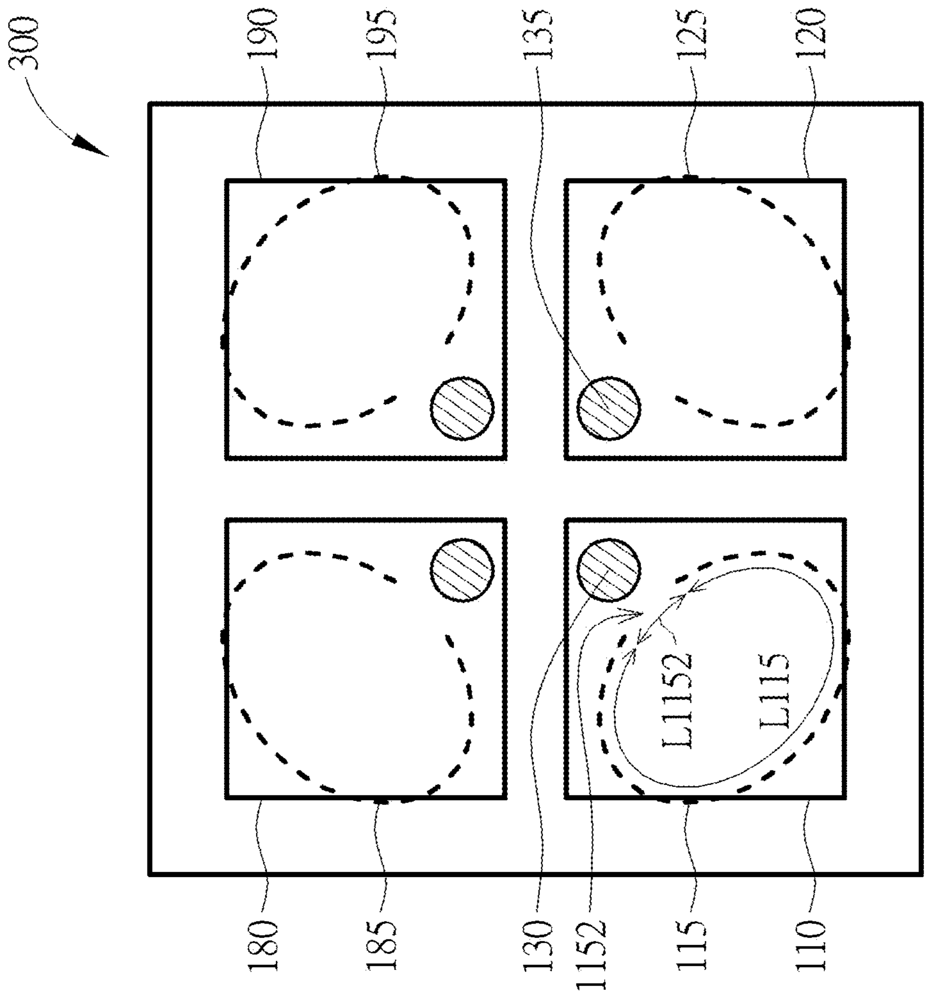
FIG. 3 illustrates an antenna according to another embodiment.

FIG. 3 illustrates a top view of an antenna 300 according to another embodiment. The antenna 300 can be similar to the antenna 100 of FIG. 1. However, in the antenna 300, each of the conductive loops can have an opening rather than being a closed conductive loop. For example, the conductive loop 115 can have an opening 1152 with a length L1152. The length L1152 of the opening 1152 can be smaller than 25% of a sum of the length L1152 and a length L115 of the conductive loop 115.

In FIG. 3, the conductive loop 115 and the conductive loop 125 can be used to suppress a signal portion of the first frequency band. A frequency corresponding to the first frequency band can be proportional to a reciprocal of a predetermined length, and the predetermined length can be twice the length L115 of the conductive loop 115.

For example, the frequency of the signal portion suppressed by conductive loop 115 and the conductive loop 125 can be represented as fm. The frequency fm can correspond to a single frequency or a set of frequencies, where m can be an index, and m can be an integer greater than zero. For example, m can be 1, 2, 3, etc. The frequency fm can be represented as fm=m×vg/(2×L115), where vg can be a phase velocity of electromagnetic (EM) waves in a dielectric material, and L115 can be the length of the conductive loop 115 as shown in FIG. 3. Therefore, the antenna 300 can suppress a signal portion corresponding to one frequency or a plurality of frequencies.

Figure 4:
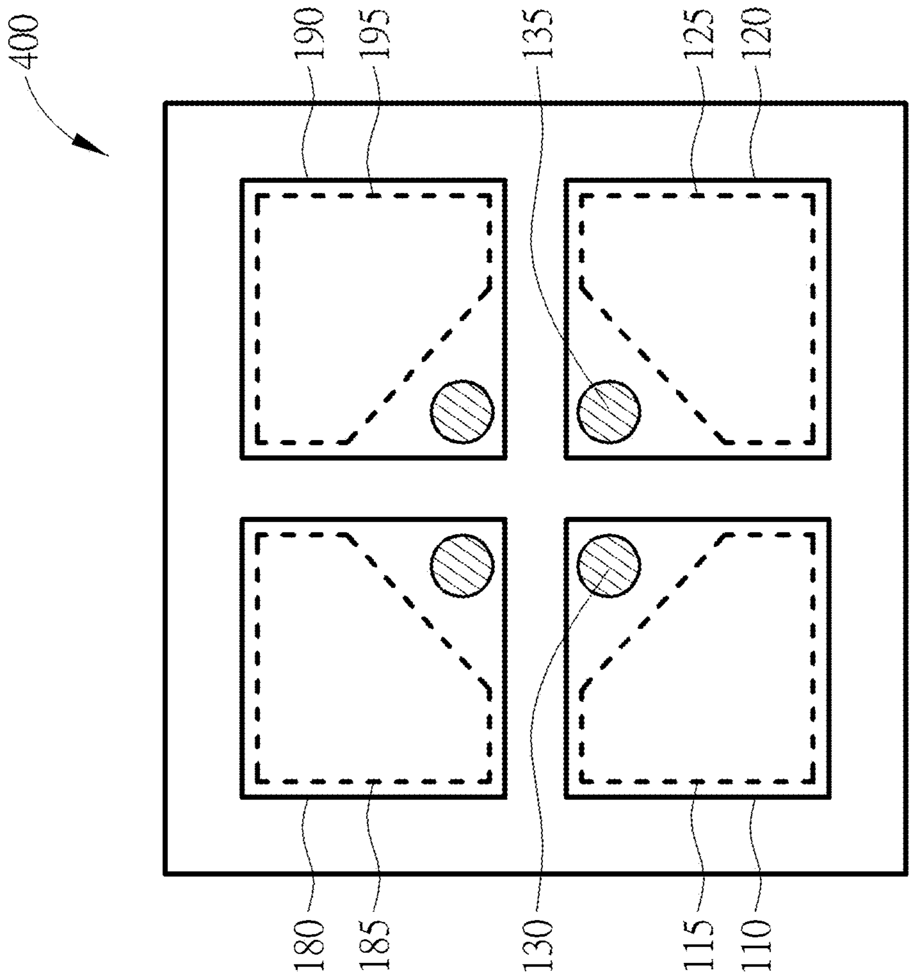
FIG. 4 illustrates a top view of an antenna according to another embodiment.

FIG. 4 illustrates a top view of an antenna 400 according to another embodiment. As shown in FIG. 4, at least one of the conductive loops 115, 125, 185, 195 can have n sides and n vertices, and n can be an integer larger than 4. In FIG. 4, the conductive loops can have a pentagonal shape. FIG. 4 is merely an example, and embodiments are not limited thereto. For example, the conductive loops can have a hexagonal shape.

Figure 5:
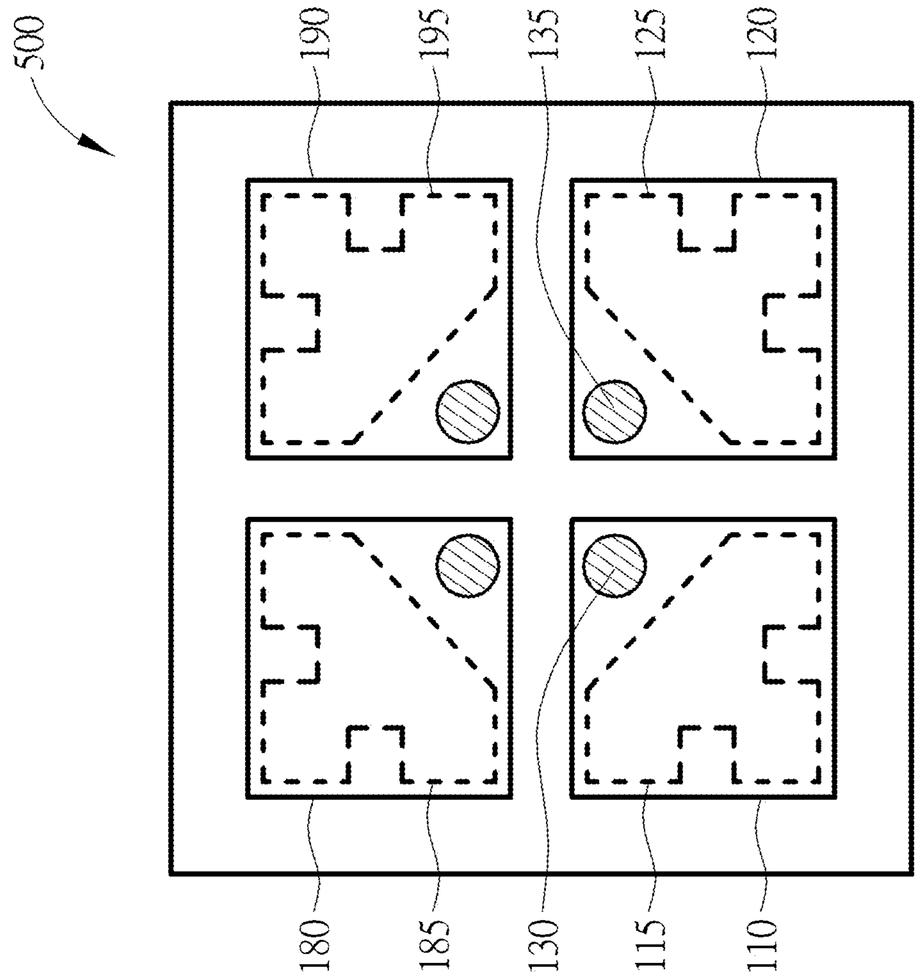
FIG. 5 illustrates a top view of an antenna according to another embodiment.

FIG. 5 illustrates a top view of an antenna 400 according to another embodiment. As shown in FIG. 5, at least one of the conductive loops 115, 125, 185, 195 can have a meandering shape.

The shape of the conductive loops can be adjusted based on experiments, calculations, and simulations. The shapes of the conductive loops can be the same or different.

FIG. 4 and FIG. 5 are examples to illustrate that the conductive loops 115, 125, 185, 195 can have various shapes. In FIG. 4 and FIG. 5, the conductive loops 115, 125, 185, 195 are closed conductive loops. However, embodiments are not limited thereto. Like FIG. 3, when a conductive loop has the polygonal shape of FIG. 4 or the meandering shape of FIG. 5, this conductive loop can also have an opening to adjust the frequency of the signal portion it suppresses.

Figure 6:
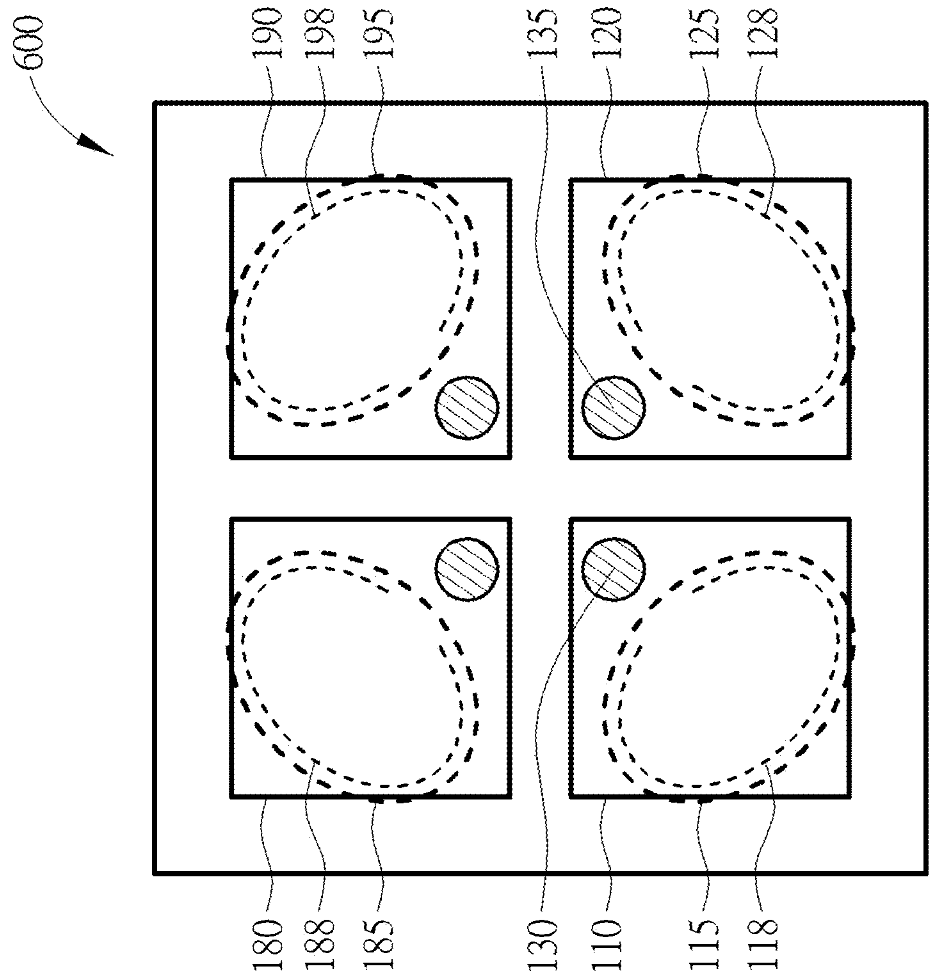
FIG. 6 illustrates a top view of an antenna according to another embodiment.

In FIG. 1 to FIG. 5, one conductive loop can be disposed below each conductive plate. In other embodiments, two or more conductive loops can be disposed below a conductive plate. FIG. 6 illustrates a top view of an antenna 600 according to another embodiment. The antenna 600 can be similar to the antenna 100 of FIG. 1, and the antenna 600 can further include conductive sub-loops 118, 128, 188 and 198. The conductive sub-loops 118, 128, 188 and 198 can be disposed below the conductive loops 115, 125, 185 and 195 respectively. In FIG. 6, the conductive loops 115, 125, 185, 195 can be used to suppress a signal portion of the first frequency band, and the conductive sub-loops 118, 128, 188, 198 can be used to suppress a signal portion of a second frequency band.

In other words, by using the conductive sub-loops 118, 128, 188, 198, signal portions of other frequencies can be suppressed, thus providing higher controllability in the operation of reducing spurious emissions.

In FIG. 6, the conductive loops 115, 125, 185, 195 are closed conductive loops with an oval shape, the conductive sub-loops 118, 128, 188, 198 are open conductive loops (conductive loops with openings) and an oval shape. As shown in FIG. 6, the enclosed area of each conductive sub-loop can be smaller than the enclosed area of the corresponding conductive loop.

However, it should be noted that FIG. 6 is merely an example, and embodiments are not limited thereto.

Both the conductive loop and its corresponding conductive sub-loop can be closed conductive loops, or they can be open conductive loops.

Alternatively, one of the conductive loop and its corresponding conductive sub-loop can be a closed conductive loop while the other can be an open conductive loop.

For example, in FIG. 6, the conductive sub-loops 118, 128, 188 and 198 can be replaced with closed conductive loops, while the conductive loops 115, 125, 185 and 195 are closed conductive loops.

In another example, in FIG. 6, the conductive loops 115, 125, 185 and 195 can be replaced with open conductive loops, while the conductive sub-loops 118, 128, 188 and 198 are open conductive loops.

In another example, in FIG. 6, the conductive loops 115, 125, 185 and 195 can be closed conductive loops, while the conductive sub-loops 118, 128, 188 and 198 are open conductive loops.

In another example, in FIG. 6, the conductive loops 115, 125, 185 and 195 can be open conductive loops, while the conductive sub-loops 118, 128, 188 and 198 are closed conductive loops.

Moreover, the enclosed area of a conductive loop (e.g. 115) can be equal to, larger than, or smaller than the enclosed area of its corresponding conductive sub-loop (e.g. 118).

Furthermore, the shape of a conductive loop (e.g. 115) may be identical to, or different from, the shape of its corresponding conductive sub-loop (e.g. 118). The shapes mentioned here can be an oval shape, a polygon, an irregular shape, a meandering shape, or other appropriate shapes.

Figure 7:
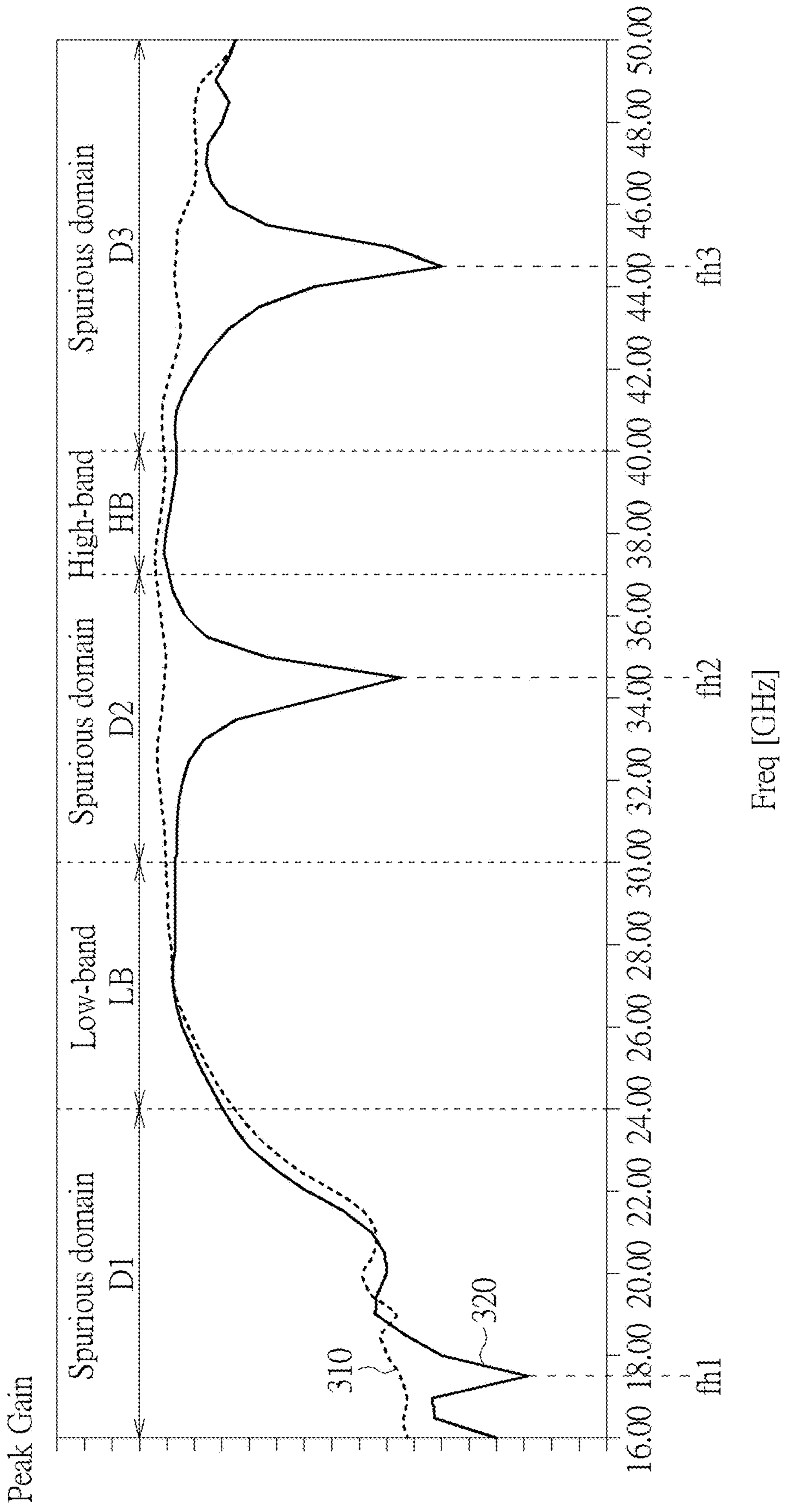
FIG. 7 is a diagram showing peak gain of signals before and after suppressing spurious emissions according to an embodiment.

FIG. 7 is a diagram showing peak gains of signals before and after suppressing spurious emissions according to an embodiment. The signals of FIG. 7 can be measured from a magneto-electric dipole (ME dipole) antenna (e.g. antenna 600 in FIG. 6). FIG. 7 is merely an example, and embodiments are not limited thereto. In FIG. 7, the horizontal axis can represent frequency, and the vertical axis can represent the peak gain of signal. In FIG. 7, a signal 310 (represented by a dashed line) and a signal 320 (represented by a solid line) are shown. In the signal 310, spurious emissions have not been suppressed. In the signal 320, spurious emissions have been suppressed.

In FIG. 7, spurious emissions can be suppressed in spurious domains D1, D2 and D3. For example, the spurious domain D1 can be approximately 16 GHz~24 GHz, the spurious domain D2 can be approximately 30 GHz~37 GHZ, and the spurious domain D3 can be approximately 40 GHz~50 GHz. In other words, the signal portions of the spurious domains D1, D2 and D3 are related to spurious emissions and should be suppressed.

As mentioned above, taking FIG. 6 as an example, the conductive loops 115, 125, 185, 195 can be used to suppress a signal portion of the first frequency band, and the conductive sub-loops 118, 128, 188, 198 can be used to suppress a signal portion of the second frequency band. In FIG. 6 and FIG. 7, the spurious domain D3 can correspond to the first frequency band, and the spurious domains D1 and D3 can correspond to the second frequency band.

In FIG. 7, desired signals are accessed within frequency bands that include a low-band LB (e.g. 24 GHz~30 GHz) and a high-band HB (e.g. 37 GHz~40 GHz). Consequently, the signal portions of the low-band LB and the high-band HB should be preserved and not be suppressed. This is to ensure the integrity of the signal within these specified frequency bands.

In FIG. 7, the frequency fh1 of the spurious domain D1 can be a harmonic frequency of the conductive sub-loops 118, 128, 188, 198 of FIG. 6, the frequency fh2 of the spurious domain D2 can be another harmonic frequency of the conductive sub-loops 118, 128, 188, 198 of FIG. 6, and frequency fh3 of the spurious domain D3 can be a harmonic frequency of the conductive sub-loops 115, 125, 185, 195 of FIG. 6.

Accordingly, as depicted in FIG. 7, the employment of conductive loops and/or conductive sub-loops can efficaciously reduce unanticipated spurious emissions, thereby enhancing the quality of signals accessed by the antenna. In addition, the absence of a requirement for filters precludes any increment in hardware dimensions and avoids the imposition of superfluous costs.

Figure 8:
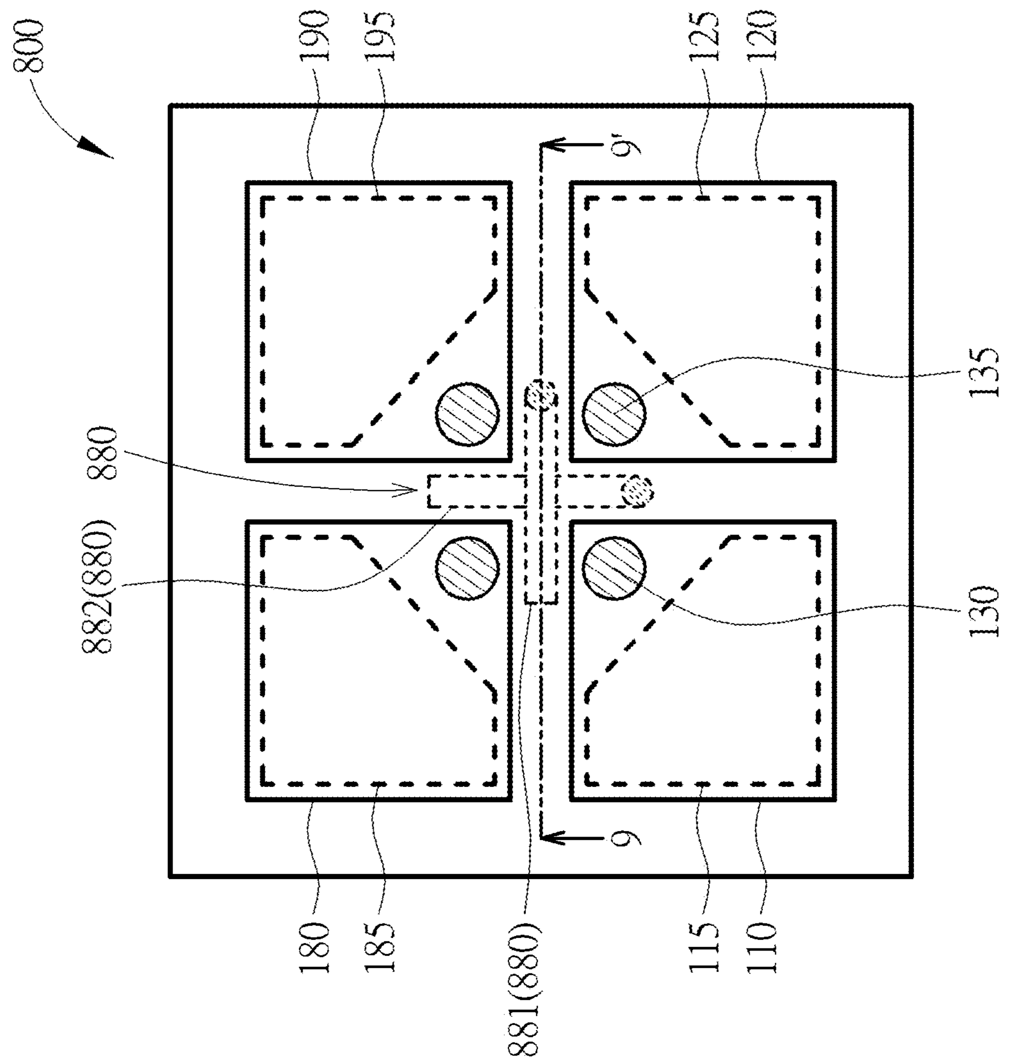
FIG. 8 illustrates a top view of an antenna according to an embodiment.
Figure 9:
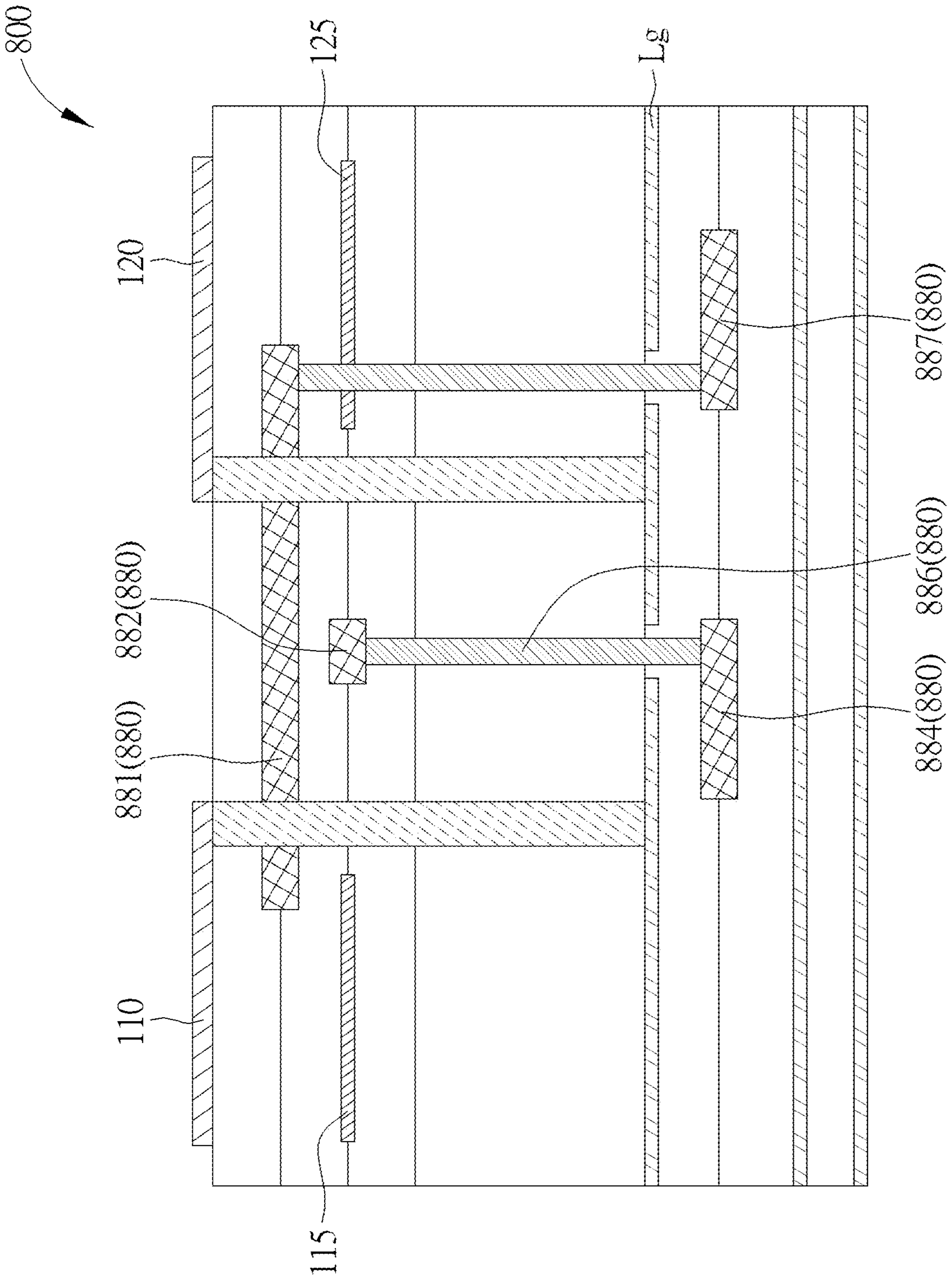
FIG. 9 illustrates a cross-sectional view of the antenna cutting along line 9-9' in FIG. 8.

FIG. 8 illustrates a top view of an antenna 800 according to an embodiment. FIG. 9 illustrates a cross-sectional view of the antenna 800 cutting along line 9-9' in FIG. 8. FIG. 9 can show a structure of a circuit board such as printed circuit board (PCB). The antenna 800 can be similar to the antennas 100, 300, 400, 500 and 600, and the antenna 800 can further include a coupling element 880 used to excite the antenna 800. The coupling element 880 can include conductive portions 881, 882, 884, 886 and 887. The conductive portion 882 can be formed partially between the first conductive loop 115 and the second conductive loop 125. The conductive portion 884 can be formed below a ground layer Lg. The conductive portion 886 can be electrically connected to the conductive portion 882 and the conductive portion 884. The antenna 800 can be excited by proximity coupling. In the antenna 800, the conductive portion 884 can correspond to a first polarization, and the conductive portion 887 can correspond to a second polarization.

Figure 10:
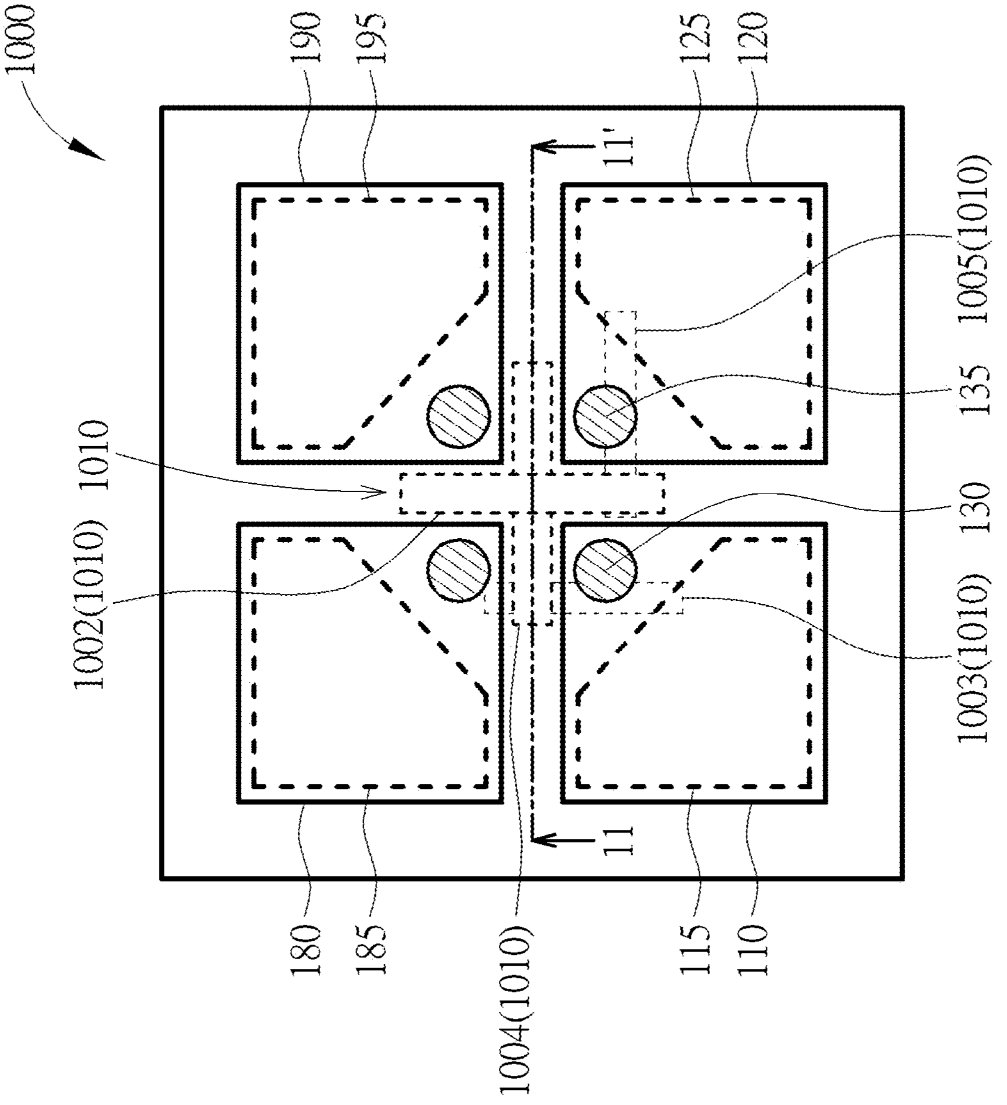
FIG. 10 illustrates a top view of an antenna according to an embodiment.
Figure 11:
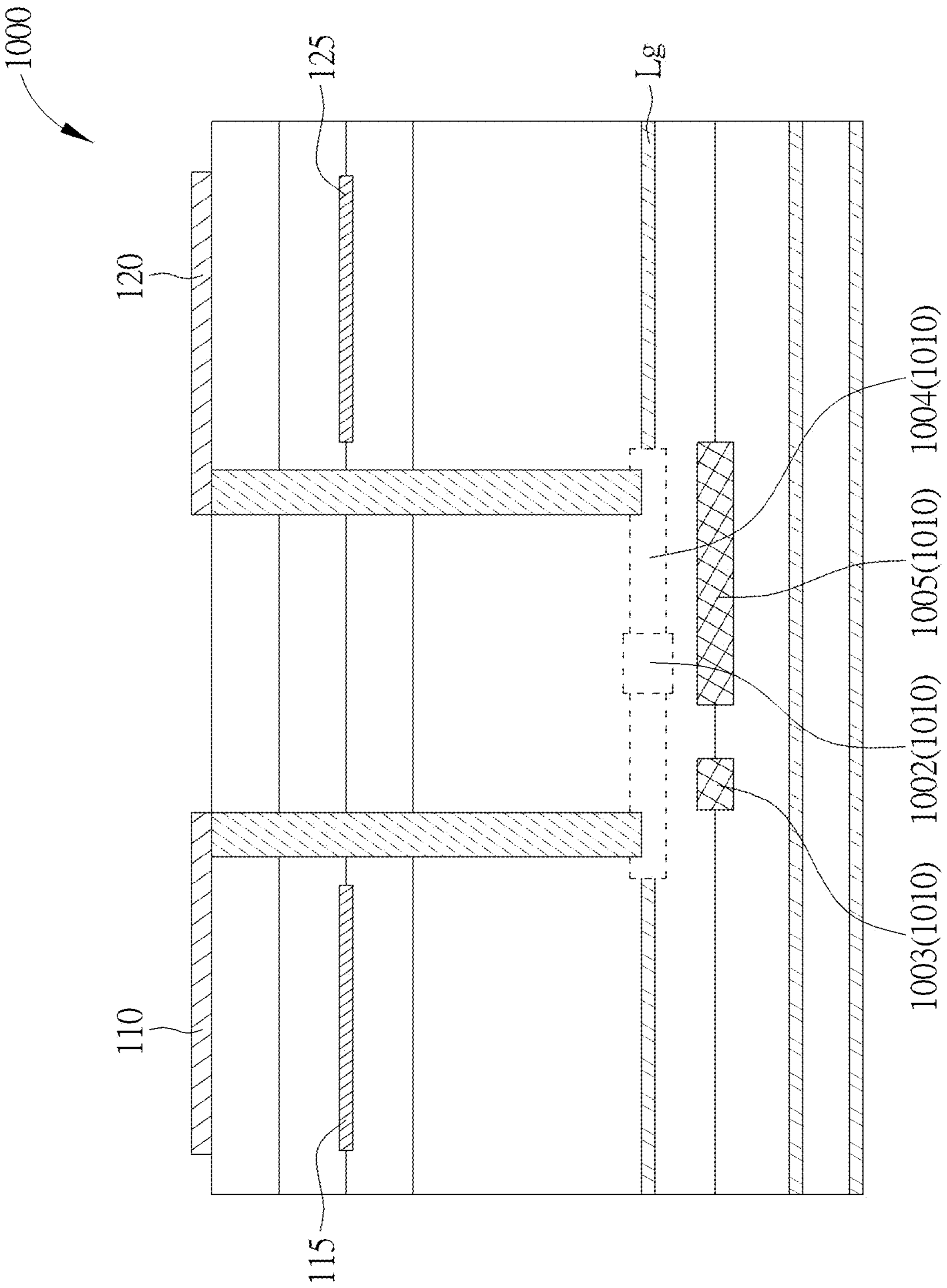
FIG. 11 illustrates a cross-sectional view of the antenna cutting along line 11-11' in FIG. 10.

FIG. 10 illustrates a top view of an antenna 1000 according to an embodiment. FIG. 11 illustrates a cross-sectional view of the antenna 1000 cutting along line 11-11' in FIG. 10. FIG. 11 can show a structure of a circuit board such as printed circuit board (PCB). The antenna 1000 can be similar to the antennas 100, 300, 400, 500 and 600, and the antenna 1000 can further include a coupling element 1010 including a slot 1002, a slot 1004, a conductive portion 1003 and a conductive portion 1005. The antenna 1000 can be excited by slot coupling. In the antenna 1000, the conductive portion 1003 can correspond to a first polarization, and the conductive portion 1005 can correspond to a second polarization.

In summary, the antennas of embodiments effectively use conductive loops and/or sub-loops to reduce unexpected spurious emissions, thereby improving the quality of signals transmitted and received by the antennas. Furthermore, the lack of a need for filters prevents increase in hardware size and eliminates unnecessary costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An antenna comprising:

a first conductive plate;

a first conductive loop disposed below the first conductive plate;

a second conductive plate;

a second conductive loop disposed below the second conductive plate;

a first conductive path comprising a first terminal electrically connected to the first conductive plate, and a second terminal electrically connected to a ground layer; and a second conductive path comprising a first terminal electrically connected to the second conductive plate, and a second terminal electrically connected to the ground layer;

wherein the first conductive plate and the second conductive plate are configured to access wireless signals, and the first conductive loop and the second conductive loop are configured to suppress a first signal portion of a first frequency band.

2. The antenna of claim 1, wherein the first conductive loop and the second conductive loop are coplanar and formed using a same conductive layer of a circuit board.

3. The antenna of claim 1, wherein the first conductive loop and the second conductive loop are non-coplanar and formed using different conductive layers of a circuit board.

4. The antenna of claim 1, wherein the first conductive loop and the second conductive loop are of a same shape.

5. The antenna of claim 1, wherein a first shape of the first conductive loop is different from a second shape of the second conductive loop.

6. The antenna of claim 1, wherein the first conductive plate has a first projected plate area, the first conductive loop has a first enclosed area, the first projected plate area overlaps a portion of the first enclosed area, the portion of the first enclosed area is larger than 90% of the first enclosed area.

7. The antenna of claim 1, wherein the first conductive loop is a closed conductive loop.

8. The antenna of claim 7, wherein the first conductive loop has a first perimeter, and a frequency in the first frequency band is proportional to a reciprocal of the first perimeter.

9. The antenna of claim 1, wherein the first conductive loop has an opening, and a length of the opening is smaller than 25% of a sum of the length of the opening and a length the first conductive loop.

10. The antenna of claim 9, wherein a frequency corresponding to the first frequency band is proportional to a reciprocal of a predetermined length, and the predetermined length is twice the length the first conductive loop.

11. The antenna of claim 1, wherein the first conductive loop has n sides and n vertices, and n is an integer larger than 4.

12. The antenna of claim 1, wherein the first conductive loop has a meandering shape.

13. The antenna of claim 1, further comprising a first conductive sub-loop disposed below the first conductive loop, and a second conductive sub-loop disposed below the second conductive loop, wherein the first conductive sub-loop and the second conductive sub-loop are configured to suppress a second signal portion of a second frequency band.

14. The antenna of claim 13, wherein the first conductive loop, the second conductive loop, the first conductive sub-loop and the second conductive sub-loop are closed conductive loops.

15. The antenna of claim 13, wherein the first conductive loop, the second conductive loop, the first conductive sub-loop and the second conductive sub-loop are open conductive loops.

16. The antenna of claim 13, wherein the first conductive loop and the second conductive loop are closed conductive loops, and the first conductive sub-loop and the second conductive sub-loop are open conductive loops.

17. The antenna of claim 13, wherein the first conductive loop and the second conductive loop are open conductive loops, and the first conductive sub-loop and the second conductive sub-loop are closed conductive loops.

18. The antenna of claim 1, further comprising:

a coupling element configured to excite the antenna, the coupling element comprising a first conductive portion formed partially between the first conductive loop and the second conductive loop, a second conductive portion formed below a ground layer, and a third conductive portion electrically connected to the first conductive portion and the second conductive portion.

19. The antenna of claim 1, further comprising:

a coupling element configured to excite the antenna, the coupling element comprising a conductive portion formed below a slot of a ground layer.

* * * * *